July 23, 1929.  G. EVENO  1,722,129
BLADE FOR AUTOMATICALLY LUBRICATED BEARINGS
Filed June 1, 1928  2 Sheets-Sheet 1
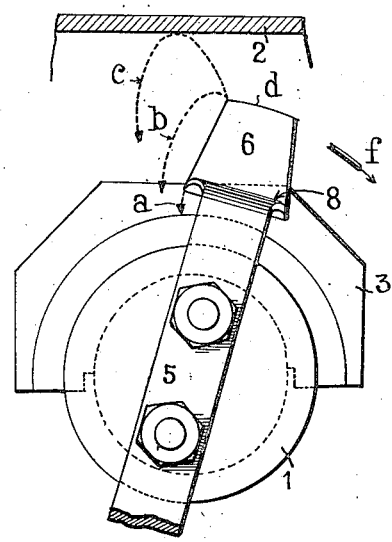
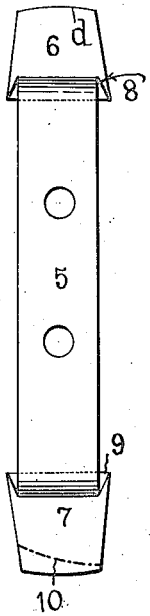
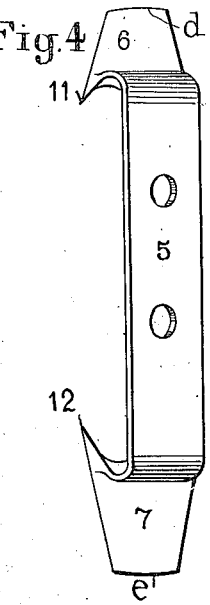
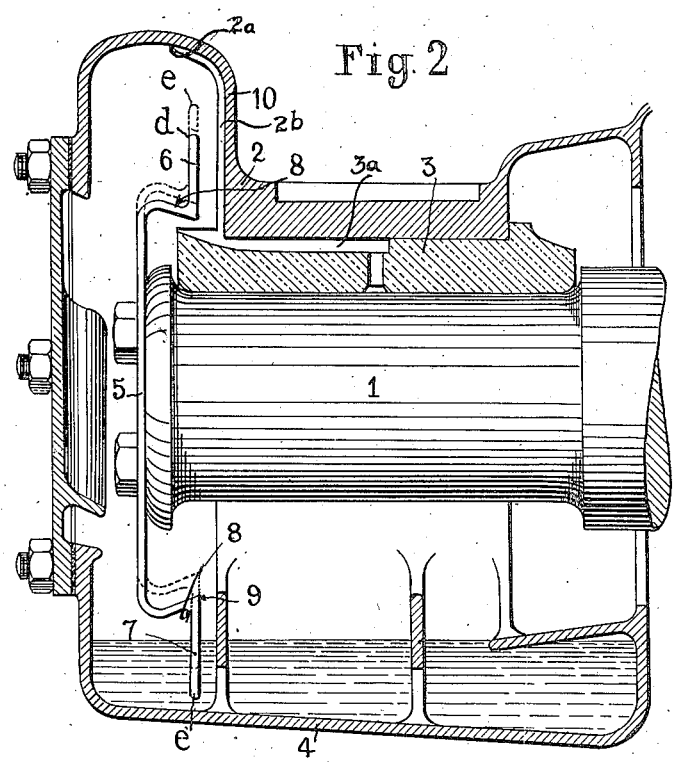

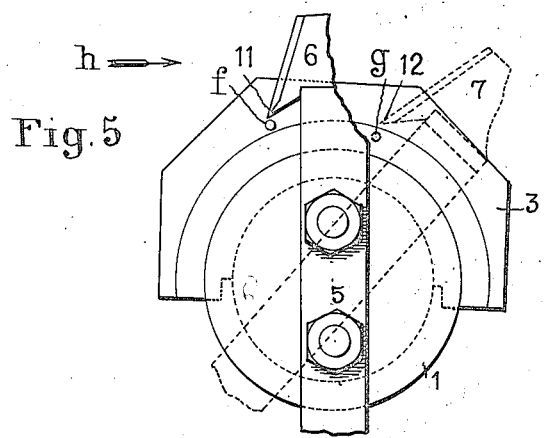
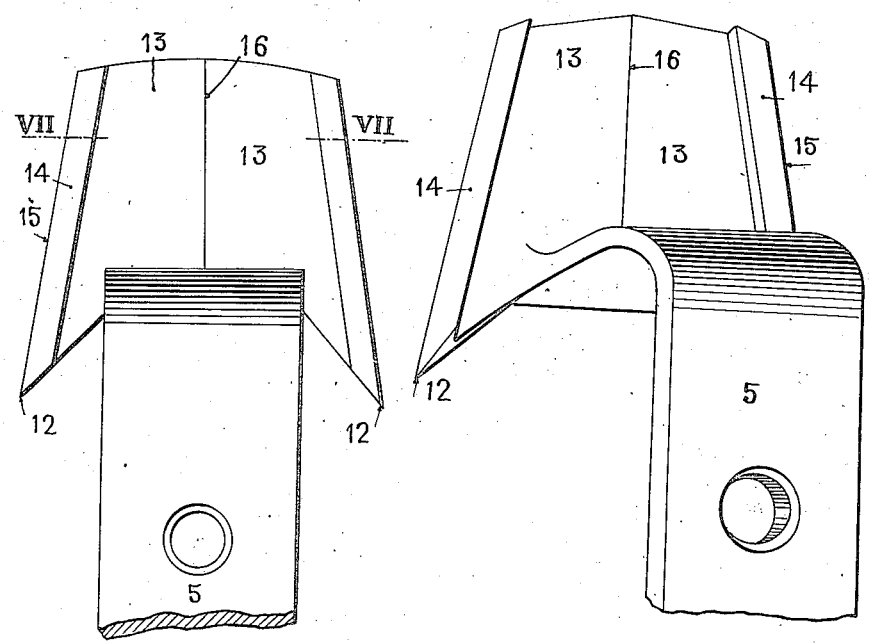
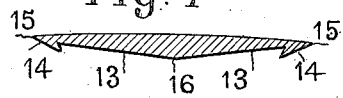

Patented July 23, 1929.

1,722,129

UNITED STATES PATENT OFFICE

GEORGES EVENO, OF PARIS, FRANCE, ASSIGNOR TO ISOTHERMOS CORPORATION OF AMERICA, OF NEW YORK, N. Y., A CORPORATION OF DELAWARE.

BLADE FOR AUTOMATICALLY-LUBRICATED BEARINGS.

Application filed June 1, 1928, Serial No. 282,174, and in France March 1, 1928.

This invention relates to improvements in blades used in automatically lubricated bearings, and has particular reference to blades for effecting automatic lubrication of a bearing from above the same by dipping into oil contained in a tank at a lower level and raising the oil so as to cause it to flow onto the bearing. It is more particularly applicable to the axle boxes of railway and tramway vehicles.

As is well known the oil which adheres to the blade, after its passage into the tank, is subjected to three different forces; capillary forces, gravity and centrifugal force due to the rotary movement. While, however, the capillary forces are always substantially the same during the movement, the centrifugal force, on the contrary, varies and it is directly opposed to gravity each time the blade passes its upper position, that is to say at the moment where it should pour the oil on to the bearing. As this centrifugal force is proportional to the square of the speed of rotation then assuming that at the start the axle turns slowly, the weight of the oil has a preponderant action and the oil, flowing through the dripping groove provided for this purpose on the blade, falls on the bearing. When the speed of the axle increases the centrifugal force increases rapidly and a time is reached when it is in equilibrium with the weight. In turn it has a preponderant action and the oil leaves the blade at the peripheral extremity thereof so as then to fall by gravity on to the bearing. If the speed of rotation is increased still more the oil is projected against the walls of the axle box from which it flows, by streaming, towards the bearing, by reason of suitably arranged guide ribs.

Thus at slow speeds and at high speeds abundant lubrication is ensured but by different methods.

There is, however, an intermediate speed of rotation, called the "critical speed", at which the lubrication is effected with less certainty and there is the possibility that should the vehicle run at this speed for any length of time the conditions of lubrication are liable to become very bad.

The invention is adapted to remedy this drawback by using blades with at least two arms which are actuated in such a manner that for the same speed of rotation of the axle they will correspond with different critical speeds in such a manner that lubrication will always be ensured by one or other of the arms of the blade.

In order that the invention may be more readily understood it will now be described with reference to the accompanying drawings showing by way of example various forms of construction.

Figure 1 is a partial front elevation.

Figure 2 is a longitudinal section of an axle box of a railway vehicle, provided with a blade with two arms in accordance with the invention.

Figure 3 is a front view of the blade alone.

Figure 4 is a perspective view thereof.

Figure 5 is an end view of the end of the axle and of the bushing, showing the method of operation of the new blade.

Figure 6 is a partial end view, to a larger scale, of a modification of construction of one of the arms of the blade, and Figure 7 is a section on the line VII—VII of Figure 6, and Figure 8 is a corresponding perspective view.

In the various figures 1 indicates the end of the axle, 2 the body of the axle box and 3 the bearing. The lower portion 4 of the axle box 2, suitably partitioned (Figure 2), forms an oil container from which the oil is taken by the ends of the two arms of the blade 5, then deposited by the trough or oil or lubricant guiding channel 8 (Figure 1) on the bearing 3 when the said ends pass above the upper portion of the bearing. The distrubutor or blade 5, in the exemplary forms illustrated, comprises a strap-like member adapted to be secured to the end of an axle or journal, the extremities of the blade having inwardly and downwardly inclined portions and end sections 6 and 7, preferably parallel with the body of the blade, forming troughs or pockets 8, the angular bends at the junctions of the sections 6 and 7 with the body forming sharp transverse edges 9 to facilitate dripping of the oil therefrom. At high speeds these ends project the oil against the inner surface of the axle box 2 from which it passes to the bearing in a manner which depends upon the speed of rotation of the axle. As shown in Fig. 2 the said inner surface of the axle box 2 is provided on its inner top surface $2^a$ and the connecting side wall $2^b$ with means for guiding and directing lubricant thrown from the ends of the pallet into the passages 3ª of the bearing 3. This means is in the form of channels which provide intervening guiding ribs for directing the oil or lubricant to flow into the passages or bearing as disclosed in my Patent No. 1,701,707, issued February 12, 1929, and Reissue No. 17,322, June 11, 1929.

The various paths followed by the oil are indicated in Figure 1.

First, at slow speeds the oil is deposited by gravity directly on the bearing by the troughs 8 when these pass over the bearing; the oil follows the path $a$. When the speed increases the centrifugal force gradually becomes preponderant and the oil leaves the blade at the peripheral edge $d$ but falls by gravity on the bearing along the path $b$. At very high speeds the oil is projected by the centrifugal force against the inner walls of the axle box 2 and passes to the bearing 3 by flowing along these walls, in principle along the path $c$.

The critical speed corresponds with the case in which the oil remains in equilibrium at the end of the blade 5, when the centrifugal force balances the weight, that is to say at a moment when the speed of rotation of the axle is slightly less than that which corresponds to the trajectory $b$; the various resistances (viscosity, friction and so forth) are factors which determine this critical period.

As the centrifugal force which is exerted on a drop of oil is proportional to its distance from the axis of rotation it is possible, according to one of the forms of construction of the invention, to make the two arms of the blade of different lengths and thus prevent conditions of equilibrium between centrifugal force and the weight to occur at the same speed at the troughs or at the ends of the said arms. Thus in Figures 2 to 5 the arm 6 is shorter than the arm 7, which difference of length is more particularly indicated in Figure 2 by the position in broken lines which corresponds to a rotation of the blade through 180° relatively to its position in full lines. In this case the trough 8 of the arm 6 will still effect lubrication by dripping whilst the edge $e$ of the arm 7 produces lubrication under the action of centrifugal force.

According to another method of construction of the invention it is also possible to limit the extremity of each arm in an asymmetrical manner as is indicated for example in chain dotted lines at 10 in Figure 3. In this manner there are obtained on the same arm 7 points at which equilibrium cannot occur simultaneously between the weight and the centrifugal force.

It is also possible to apply the same principle of lubrication by dripping at low speeds along the trough.

In order to prevent equilibrium between the weight, centrifugal force and capillary actions from being produced along the whole length of this trough and to promote the discharge of oil under the combined actions of its weight and capillary forces the ends of the trough are provided with points in the form of barbs 11 and 12 (Figure 4) which break the continuity, collect the oil and ensure its detachment at the necessary moment.

In this manner the action of the capillary forces is increased in the same sense as the weight.

The various barbs may be of different shapes and lengths in such a manner that the lubricant is distributed by some of them in the forward zone (recovery) of the bearing and by the others in the rear zone. Figure 5 shows how the barb 11 of reduced height distributes more quickly the oil adhering to the surface thereof and allows it to escape at $f$ on the left-hand portion of the bearing, while a second barb 12 of greater height retards the flow of oil and distributes it at a slightly later period at $g$ on the right-hand side of the bearing, assuming that rotation is effected in the direction of the arrow $h$.

In this manner all the recovery zone for the oil will be abundantly supplied at slow speeds.

The arm of the blade which dips into the oil may also be of such a shape that a larger quantity of oil will be raised from the container. In order to obtain the best distribution of the oil it is preferable to cause a number of drops to successively leave the blade or for these to fall in a continuous stream during a predetermined period of time and thus reaching different parts of the bushing.

For this purpose the surface of the blade is increased and it is provided with suitable edges as illustrated in Figures 6, 7 and 8 in which the section of the blade is provided with inclined surfaces 13 (Figure 7). It is also possible to provide these surfaces 13 with flanges 14 at a right angle or undercut so as to retain the oil adhering thereto when leaving the container.

The oil is cut by the edge 15 of the blade, the flange 14 separates the oil without agitating the same and as the flange 14 does not extend beyond the thickness of the ridge 16 formed along the axis of the blade, this entry into the oil will not cause any churning or agitation of the oil and the opposite edge 15 prevents any eddy when the blade leaves the oil.

At high speeds the trapezoidal shape of the end of the blade facilitates the projection of the lubricant by centrifugal force and the edges provided on the inclined surfaces, while retarding the flow, enable the recovery or receiving channels provided on the body of the axle box to be abundantly lubricated.

The flanges 14 may be terminated, on the side of the end of the axle, in the form of points or barbs 12 adapted to facilitate, at low speeds of rotation, the flow of oil which has collected in these channels and its direct dripping on to the bearing.

It will be understood that without departing from the scope of the invention various modifications may be made which do not modify the scope thereof and any suitable materials may be used for the construction thereof, while the shapes illustrated may be varied for producing satisfactory results under the conditions indicated.

For example it is possible to use blades having more than two arms, impart to them any shape responding to the particular conditions, combining in any suitable manner, on the same arm, the various features responding to the spirit of the invention either as regards the peripheral edges, the shape of the trough, or even interrupting the continuity of the peripheral edges and providing them also with points.

It is also possible to modify the section of the blade and the outline of the edges shown in Figures 6, 7 and 8, provided that they have a very low resistance when passing into the oil and that they also enable a sufficient quantity of oil to be drawn from the container by the blade.

Finally it is also possible to modify the outline of the edges 15 as shown in Figure 6 as the quantity of oil carried thereby depends upon the angle at which they cut the free surface of the oil when leaving the container.

It will be understood that the various forms of construction described and illustrated may be used separately or in combination.

I claim:—

1. The combination with an oil container for lubricating rotary members, of a rotary blade adapted to dip into the oil in said container during the rotation of said blade, and a plurality of arms on said blade, said arms being of different lengths.

2. The combination with an oil container for lubricating rotary members, of a rotary blade adapted to dip into the oil in said container during the rotation of said blade, and a plurality of arms on said blade, said arms being of different shapes.

3. The combination with an oil container for lubricating rotary members, of a rotary blade adapted to dip into the oil in said container during the rotation of said blade, and a plurality of arms on said blade, and troughs carried by said arms, said troughs being arranged in different positions from the centre of rotation of said arms.

4. The combination with an oil container for lubricating rotary members, of a rotary blade adapted to dip into the oil in said container during the rotation of said blade, and a plurality of arms on said blade, and troughs formed on said arms at different positions from the centre of rotation of said arms, said troughs having outlet points arranged at different levels.

5. In a lubricating system a rotary member comprising a plurality of arms mounted for rotation, troughs provided adjacent the ends of said arms, said troughs being arranged at different distances from the centre of rotation of said arms, the extremities of the arms beyond the troughs being tapered from the longitudinal axis thereof towards the edge.

6. In a lubricating system a rotary member comprising a plurality of arms mounted for rotation, troughs provided adjacent the ends of said arms, said troughs being arranged at different distances from the centre of rotation of said arms, the extremities of the arms beyond the troughs being tapered from the longitudinal axis thereof towards the edge, and portions on said troughs extending laterally of the arms and inclined away from the ends of said arms.

7. In a lubricating system a rotary member comprising a plurality of arms mounted for rotation, troughs provided adjacent the ends of said arms, said troughs being arranged at different distances from the centre of rotation of said arms, the extremities of the arms beyond the troughs being tapered from the longitudinal axis thereof towards the edge, and channels formed adjacent the edges of the portions of the arms beyond the troughs.

8. In a lubricating system a rotary member comprising a plurality of arms mounted for rotation, troughs provided adjacent the ends of said arms, said troughs being arranged at different distances from the centre of rotation of said arms, the extremities of the arms beyond the troughs being tapered from the longitudinal axis thereof towards the edge, and undercut channels formed adjacent the edges of the portions of the arms beyond the troughs.

9. In a lubricating system a rotary member comprising a plurality of arms mounted for rotation, troughs provided adjacent the ends of said arms, said troughs being arranged at different distances from the centre of rotation of said arms, the extremities of the arms beyond the troughs being tapered from the longitudinal axis thereof towards the edge, the portions of the arms beyond the troughs terminating at different distances from the axis of rotation of the arms.

10. A lubricating device for journal boxes comprising a flat strip-like blade adapted to be secured to the axle and having a terminal section of knife blade formation adapted to dip into and cut edgewise through the oil.

11. A distributor blade for automatic lubricator systems comprising a body portion and laterally offset end sections disposed at different radial distances from the center of rotation of said blade.

12. A distributor blade for automatic lubricator systems comprising a body portion and laterally offset end sections disposed at different radial distances from the center of rotation of said blade, said sections having sharp transverse edges at their junctions with the body portion.

13. A distributor blade for automatic lubricating systems having its opposite ends at different radial distances from the center of rotation of said blade.

14. A distributor blade for automatic lubricating systems comprising a body portion and laterally offset end sections forming pockets on one face and transverse dripping edges on the other face.

15. A distributor blade for automatic lubricating systems comprising a body portion and a laterally offset end section forming a pocket on one face and a transverse dripping edge on the other face, the pocket face being tapered from the longitudinal axis toward the lateral edges.

16. A distributor blade for automatic lubricating systems comprising a body portion and a laterally offset end section forming a pocket on one face and a transverse dripping edge on the other face, the pocket face being tapered from the longitudinal axis toward the lateral edges, and inclined marginal flanges adjacent said lateral edges.

17. A distributor blade for automatic lubricating systems comprising a body portion and a laterally offset end section forming a pocket on one face and a transverse dripping edge on the other face, the lateral edges and dripping edges of the end section being extended to form pointed barbs.

GEORGES EVENO.